United States Patent
Furuya et al.

(10) Patent No.: US 6,731,041 B2
(45) Date of Patent: May 4, 2004

(54) ROTOR FOR SMALL MOTORS AND MANUFACTURING METHOD THEREFOR

(75) Inventors: Kenji Furuya, Matsudo (JP); Makoto Kimura, Matsudo (JP)

(73) Assignee: Mabuchi Motor Co., Ltd., Chiba (JP)

( * ) Notice: Subject to any disclaimer, the term of this patent is extended or adjusted under 35 U.S.C. 154(b) by 0 days.

(21) Appl. No.: 10/075,931

(22) Filed: Feb. 14, 2002

(65) Prior Publication Data

US 2002/0121834 A1 Sep. 5, 2002

(30) Foreign Application Priority Data

Mar. 1, 2001 (JP) .......................................... 2001-56677

(51) Int. Cl.$^7$ .............................................. H02K 13/00
(52) U.S. Cl. ........................................................ 310/234
(58) Field of Search ................................. 310/233, 234, 310/219, 220, 222, 236

(56) References Cited

U.S. PATENT DOCUMENTS

| | | | | |
|---|---|---|---|---|
| 1,357,016 A | * | 10/1920 | Zimmerman | ................ 310/233 |
| 1,525,967 A | * | 2/1925 | Vogel | ........................... 310/235 |
| 2,845,556 A | * | 7/1958 | Gunkler et al. | .............. 310/234 |
| 3,223,869 A | * | 12/1965 | Reisnecker | ................... 188/325 |
| 4,408,140 A | * | 10/1983 | Thompson | ................... 310/234 |
| 5,895,990 A | * | 4/1999 | Lau | ............................... 310/51 |
| 6,153,960 A | * | 11/2000 | Katagiri et al. | .............. 310/269 |

* cited by examiner

*Primary Examiner*—Dang Le
(74) *Attorney, Agent, or Firm*—McGlew and Tuttle, P.C

(57) ABSTRACT

Each of the rotor magnetic poles is composed of a winding around a laminated core and each of both ends of each wound wire is connected to a commutator leg part coupled with a tip of a corresponding commutator segment of the commutator unit. Each of the commutator leg parts includes a base portion extending outward in a direction substantially normal to the radial direction from the tip of the corresponding commutator segment tip and coupled to the commutator segment top and a tip portion narrowed stepwise to let the ends of a wound wire be connected. A disk-shaped varistor having a hole at the center is mounted over the base portion of the commutator leg part, and each electrode of the varistor is soldered onto the corresponding base portion. Further, the commutator leg parts are punched and cut out of a reel-wound flat parent metal sheet and fixed to the commutator segment tips.

9 Claims, 4 Drawing Sheets

Commutator unit

Varistor

Electrode

Commutator unit

Varistor

Electrode

Parent metal sheet to punch out commutator leg parts

Cut-off part

Commutator leg part

Cut

Commutator leg part

Tip portion

Base portion

ROTOR FOR SMALL MOTORS AND MANUFACTURING METHOD THEREFOR

BACKGROUND OF THE INVENTION

1. Field of the Invention

The present invention relates to a rotor for small motors, which permits ready functioning of a commutator leg part to each commutator segment end and fitting and connection of a varistor, and a manufacturing method therefor.

2. Description of the Related Art

Connection of each commutator segment and a wound wire end according to the prior art will be described with reference to FIG. 5. FIG. 5 shows a schematic perspective view of the commutator unit of a small motor. In the drawing, reference numeral 11 denotes the shaft of a rotor; 22, a commutator segment; 24, a commutator core; and 26, a commutator leg part. Thus the commutator unit is composed of commutator segments 22 arranged over a resin-made commutator core 24 and commutator leg parts 26, each formed integrally with and at the end of a commutator segment 22 for connecting a wound wire end. FIG. 6 shows a profile of the commutator unit shown in FIG. 5 in a state of being coupled with a wound wire end. The commutator leg part 26, as illustrated, is caused to press down a wound wire end by being bent toward the commutator segment, and is spot-welded.

FIG. 7 shows a varistor alone on its right part and the varistor in a fitted and connected state in the left part. In a small motor having a commutator, when a brush in sliding contact with the commutator passes between commutator segments, an arc is generated, and this arc may jam communication equipment or shorten the useful life of the brush. To solve these problems, fitting a varistor to the rotor of the motor as a spark suppressing element is a known art. An example of such varistor has the shape shown in the right part of FIG. 7. Its overall shape is a doughnut-like disk, and has as many electrodes as the magnetic poles of the rotor, i.e. as many as the commutator segments. Each electrode of this varistor 21 is soldered onto one or another of the commutator leg parts 26. This soldering not only electrically connects the varistor 21 but also is mechanically fixed concentrically with the commutator unit 20.

However, by this conventional connecting and fixing method, as oxidized film is formed over the commutator leg part 26 after wound wire ends are pressed down with the commutator leg part 26 and spot-welded, it is difficult to solder the varistor over them. Therefore, the oxidized film of the soldered portion of the commutator leg part has to be scraped off before the varistor is soldered.

The varistor connecting method according to the prior art also involves the problem of having to use a large quantity of solder because the varistor is mechanically fixed by bridging with solder as shown in FIG. 7.

SUMMARY OF THE INVENTION

An object of the present invention, therefore, is to solve these problems and make it possible to assemble the commutator unit and to fit and connect the varistor with remarkable working ease without having to scrape off the oxidized film of the soldered portion of the commutator leg part before soldering the varistor or to bridge the varistor using a large quantity of solder.

Another object of the present invention is to enhance the yield of commutator constituent parts relative to the input of materials, facilitate automation, make possible the choice of the most suitable commutator segment material irrespective of the commutator leg part material and reduce the manufacturing cost.

A rotor for small motors and a manufacturing method therefor according to the invention are such that a plurality of rotor magnetic poles of a salient-pole configuration and a commutator unit are provided on the shaft of the rotor, each of the rotor magnetic poles being composed of a winding around a laminated core and each of both ends of each wound wire being connected to a commutator leg part coupled with a tip of a corresponding commutator segment of the commutator unit. Each of the commutator leg parts comprises a base portion extending outward in a direction substantially normal to the radial direction from the tip of the corresponding commutator segment tip and coupled with the commutator segment tip and a tip portion narrowed stepwise to let the ends of a wound wire be connected. A disk-shaped varistor having a hole at the center is mounted over the base portion of each of the commutator leg parts on the reverse side to the winding in the axial direction of a shaft, and each electrode of the varistor is soldered onto the corresponding base portion.

Further according to the present invention, the commutator leg parts are punched and cut out of a reel-wound flat parent metal sheet and fixed to the commutator segment tips.

DETAILED DESCRIPTION OF THE PREFERRED EMBODIMENTS

Figure 4:
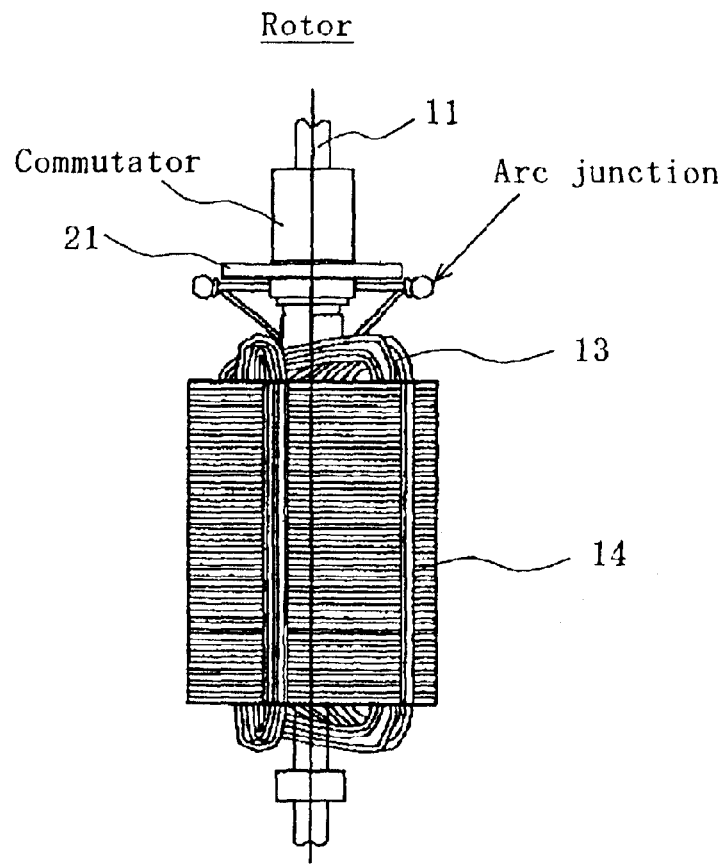
FIG. 4 illustrates the configuration of a rotor for small motors to which the present invention can be applied.
Figure 5:
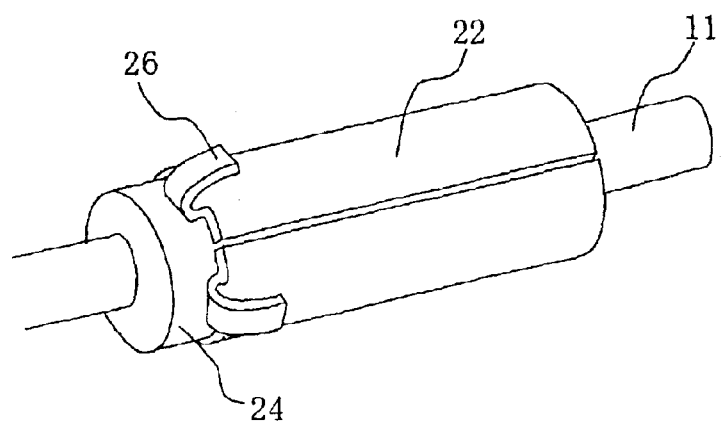
FIG. 5 shows a schematic perspective view of the commutator unit of a small motor according to the prior art.
Figure 6:
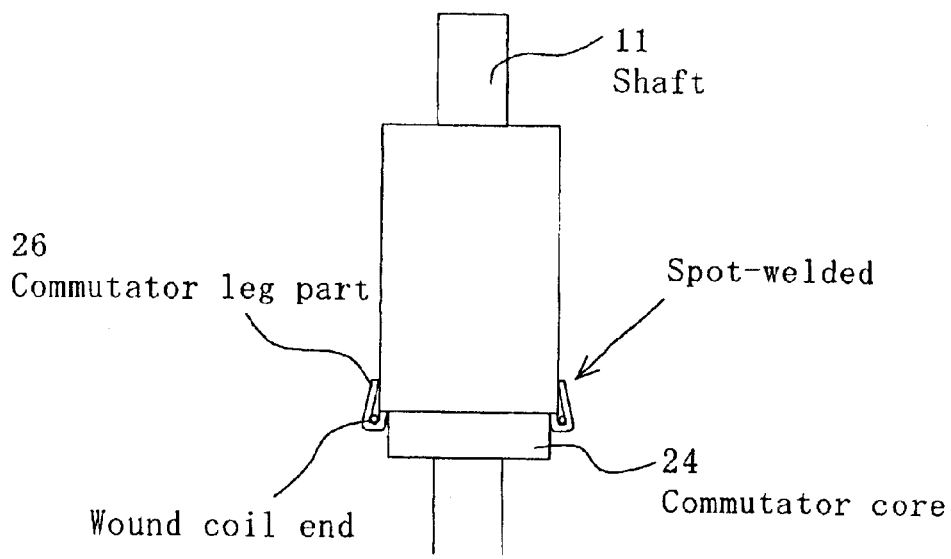
FIG. 6 shows a profile of the commutator unit shown in FIG. 5 in a state of being coupled with a wound wire end.

FIG. 4 illustrates the configuration of a rotor for small motors to which the present invention can be applied. The configuration on the stator side is not illustrated here, but any appropriate conventional configuration can be used with this rotor. For instance, a small motor can be completed by inserting the illustrated rotor into a hollow cylindrical metallic case having a bottom, fitted with two magnets on its inner circumference and fitting a case lid to cover the open end of the metallic case. This results in supporting the both ends of the shaft 11 of the rotor by two bearings, of which one is provided at the center of the case bottom and the other, on the case lid. As usual, there is also provided a brush supported by the case lid. This brush, while being in sliding contact with a commutator on the rotor, is coupled to an input terminal penetrating the case lid and protruding inside, to supply electric power from outside.

Over the rotor shaft 11 are configured in a usual manner and fitted a plurality of magnetic poles of the rotor in the salient-pole configuration. Each of these rotor magnetic poles is composed, in a usual manner, of a winding 13 formed around a laminated core 14. The both ends of each of the windings, which are as many as the magnetic poles, are connected by arc Functioning, for instance, after being wound around a commutator leg part coupled to a corresponding commutator segment. As a result, the tip of each commutator leg part, as illustrated, is welded into a ball shape together with the wire wound around it.

Figure 1:
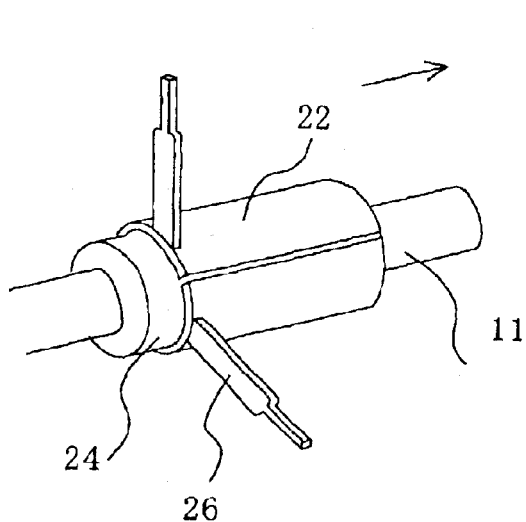
FIG. 1 shows a schematic perspective view of the configuration of a commutator unit to be fitted onto the shaft of the rotor.
Figure 1:
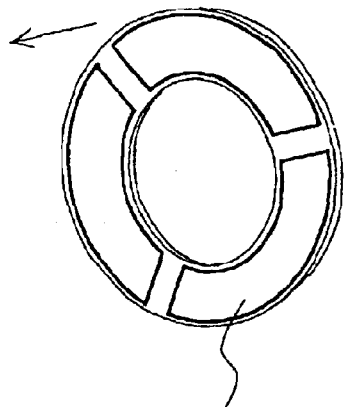

FIG. 1 shows a schematic perspective view of the configuration of a commutator unit to be fitted onto the rotor shaft. In the drawing, reference numeral 11 denotes the shaft of the rotor; 22, a commutator segment; 24, the commutator core; and 26, a commutator leg part. As illustrated, the commutator unit is composed of commutator segments 22 arranged over the resin-made commutator core 24 and the commutator leg parts 26 coupled to the commutator segments 22 to connect wound wire ends. While these commutator leg parts 26 can be formed integrally with the commutator segments to be bendable substantially at a right angle, and more preferably, as will be detailed later on, they can be formed by separately formed commutator leg parts 26 being fixed to the ends of corresponding commutator segments. After the commutator unit is inserted into a hole at the center of the varistor shown in the right part of FIG. 1 to bring the commutator leg parts 26 into contact with the respectively corresponding electrodes of the varistor, the contact parts are soldered.

The assembled commutator unit is mounted on the shaft 11 along with the laminated core 14. Then, after the wire is wound in this manner and both ends of each round of winding are wound around the commutator leg parts, the rotor is set to an arc welding machine to arc-weld the tips of the commutator leg parts around which the wound wire ends have been wound. As shown in FIG. 4, the assembly of the rotor is completed by Functioning the wound wire end to the tip portions of the commutator leg parts by the arc heat.

Figure 3:
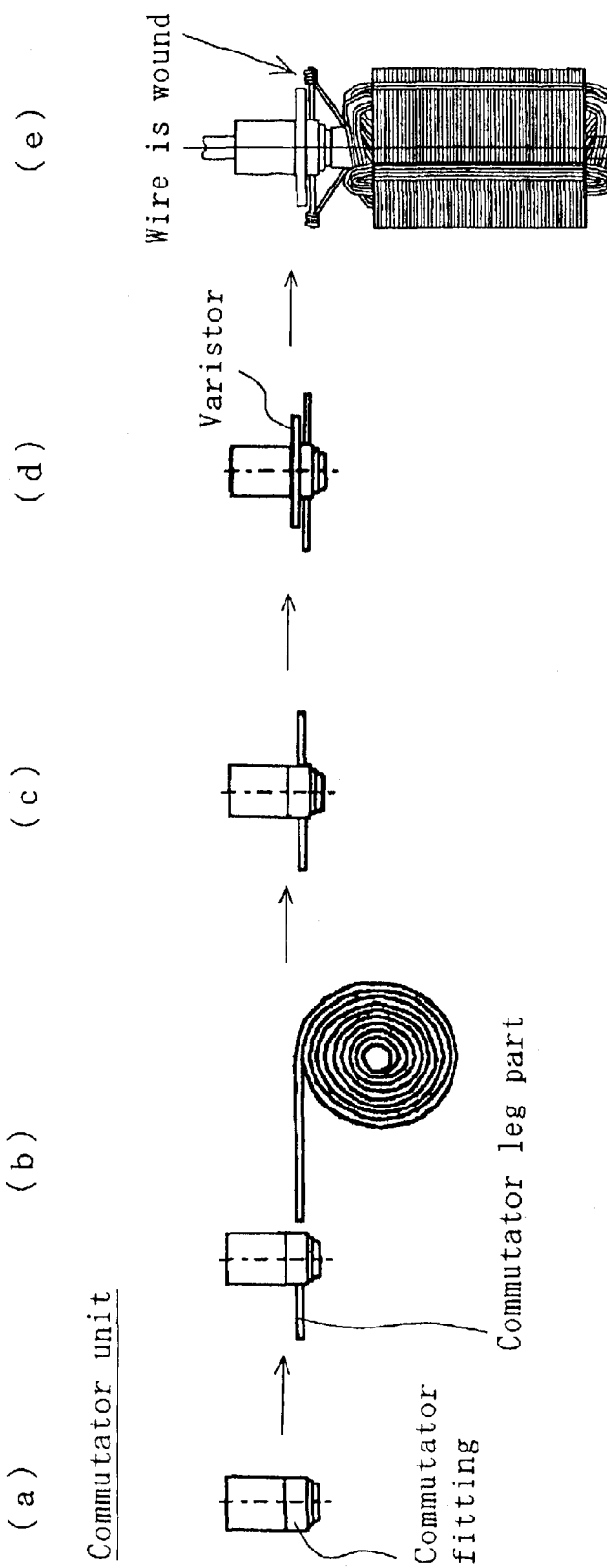
FIGS. 3(a) to 3(e) illustrate how a commutator leg part is installed on a commutator fitting.

FIG. 3 illustrates how a commutator leg part is installed on a commutator fitting. The commutator fitting here refers to an end of a commutator segment, i.e. the part of the commutator segment where the commutator leg part is to be installed. The commutator leg part is installed on the surface of the commutator fitting shown in FIG. 3A so that the leg part extends from there at a right angle to the fitting outward in the radial direction.

Figure 2:
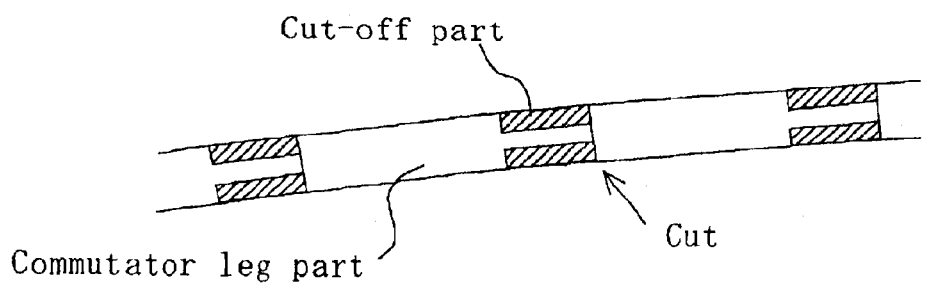
FIG. 2 illustrates a parent metal sheet out of which commutator leg parts are to be punched and the commutator leg part.
Figure 2:
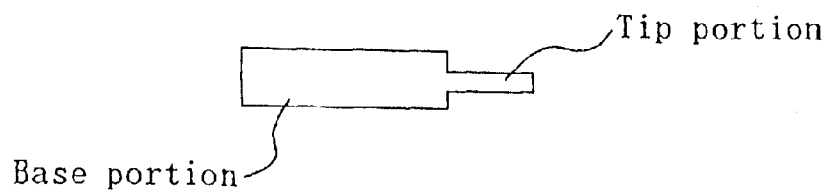

FIG. 3B illustrates a state in which, after one commutator leg part has been installed, a second commutator leg part is to be installed. Further, as shown in FIG. 2, the commutator leg part can be formed by punching (and cutting) out of a reel-wound flat parent metal sheet. This commutator leg part consists of a base portion for supporting the varistor and a tip portion narrowed stepwise to let a wound wire end be wound around it. The length and width of the narrowed tip portion are determined to be optimal for winding the wound wire end around it. While it is possible to fix the commutator leg part to the commutator fitting after it is punched out, it is preferable to punch it out at the same time as fixing it by welding or to punch it out after fixing, because it would enhance the working ease.

FIG. 3C illustrates a state in which the fixing of the commutator leg parts has been completed (only two commutator leg parts are shown here). By forming the commutator leg parts in advance and fixing them instead of forming them integrally with the commutator fitting, the following advantages are achieved.

1) The material yield is enhanced because there is no need to make a complexly shaped item.

2) Automation is facilitated because intertwining of parts, to which integral formation would be susceptible, does not occur.

3) Whereas the most suitable material for the commutator segments should be used for given welding conditions and soldering conditions which differ from one motor item to another, the choice of the most suitable material for the commutator segments irrespective of the material of the commutator leg parts is made possible by the separate formation method. For instance, phosphor bronze-made commutator leg parts can be satisfactorily arc-welded with copper wires or copper-made commutator segments. Where no varistor is used, short pieces are used for the base portions of the commutator leg parts shown in FIG. 2, and it is made possible to fabricate the commutator segments irrespective of that.

FIG. 3D illustrates a state in which a varistor having a hole at the center as shown in FIG. 1 is mounted on the commutator unit on which the commutator leg parts were installed earlier and the electrodes of the varistor are soldered onto the respectively corresponding commutator leg parts. Since a side of each commutator leg part and a side electrode of the disk-shaped varistor are soldered together in this way, soldering can be achieved with remarkable working ease by using a reflow soldering technique. Moreover, since the commutator unit is still a separate element at this stage, there is no risk for the solder to scatter to other parts on the rotor including the windings, and accordingly a washing step can be dispensed with.

Figure 7:
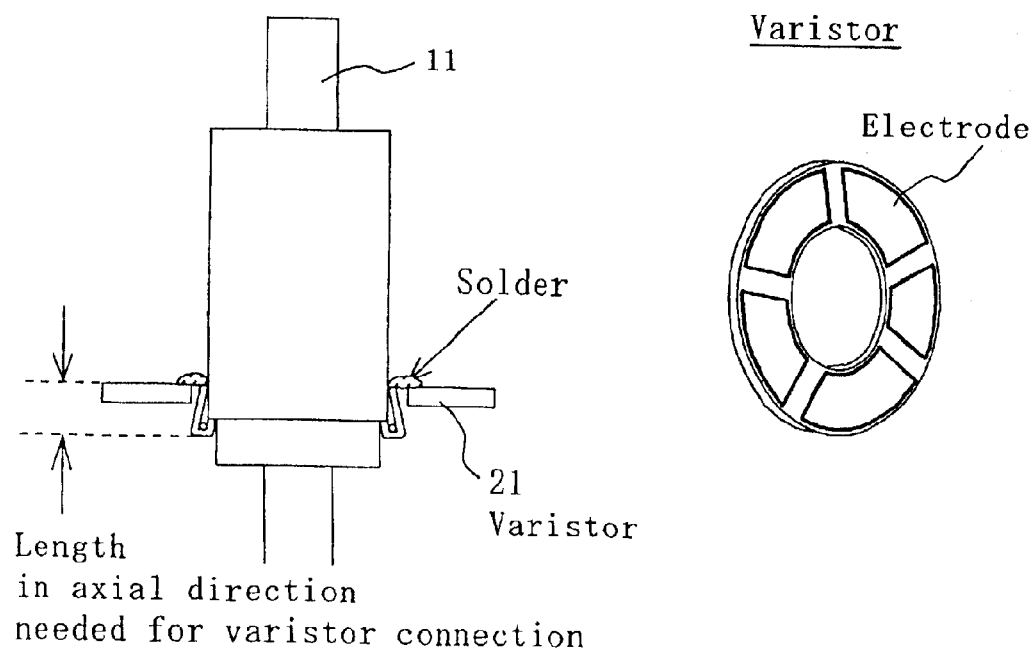
FIG. 7 shows a varistor alone on its right part and the varistor in a fitted and connected state in the left part.

Further, as illustrated, since the varistor is soldered to the commutator leg parts each extending from the end of a commutator segment outward substantially at a right angle in the radial direction as illustrated, the length of the shaft in its axial direction required for its connection can be reduced. By contrast according to the prior art described with reference to FIG. 7, the length of the shaft in its axial direction required for connecting the wound wire end and the varistor is increased because the commutator leg parts are folded. In order to maximize the number of wires that can be wound while reducing the motor size, it is necessary to secure sufficient space between salient pole cores as well as sufficient space for the windings bulging out of the cores on both sides of the shaft in the axial direction, the present invention enables greater space to be secured for windings in the axial direction of the shaft than according to the prior art.

FIG. 3E shows a state in which, after the completed commutator unit is mounted onto the shaft, the wire is wound and the wound wire ends are wound around the commutator leg parts. After that, the tip of each commutator leg part is arc-junctioned to complete the rotor as described in conjunction with FIG. 4.

Since the present invention provides for a configuration in which each of the commutator leg parts is composed of a base portion coupled to the tip of a commutator segment and a tip portion for connecting the ends of a wound wire, and the disk-shaped varistor is supported by the base portions of the commutator leg parts and soldered, there is no need to scrape off the oxidized film of the soldered portions of the commutator leg parts before soldering the varistor or to bridge the varistor using a large quantity of solder, and it is made possible to assemble the commutator unit, connect wound wire ends to it, and to fit and connect the varistor with remarkable working ease.

Furthermore, as the commutator leg parts are fixed by welding after they are formed separately from the commutator segments, the invention provides the additional advantages of enhancing the material yield of the commutator constituent parts, facilitating automation because there is no intertwining of parts, and making it possible to choose the most suitable commutator segment material irrespective of the commutator leg part material and, where no varistor is used, to reduce the manufacturing cost because shorter commutator leg parts can be used.

What is claimed is:

1. A commutator for a rotor of a motor, the commutator comprising:
   a plurality of commutator segments each having a segment surface, said plurality of commutator segments being arranged to have said segment surfaces form a cylindrical shape;
   a plurality of commutator legs each formed separately from said commutator segments, each said commutator leg having a flat shape and being welded to one of said segment surfaces of said commutator segments, said each commutator leg extending outward from a respective said segment surface in a radial direction of said cylindrical shape.

2. A commutator in accordance with claim 1, wherein:
   said each commutator leg has a base portion welded to said respective segment surface;
   said each commutator leg has a tip portion extending from said base portion in said radial direction, said tip portion being narrower than said base portion.

3. A commutator in accordance with claim 2, further comprising:
   a varistor having a disk shape and defining a hole in a substantially center portion of said disk shape, said varistor being arranged around said plurality of commutator segments and having a plurality of electrodes soldered to said base portions of said commutator legs, said tip portion extending radially outwards from said varistor.

4. A commutator in accordance with claim 3, further comprising:
   a shaft with a plurality of rotor magnetic poles, said commutator segments being mounted on said shaft, said plurality of commutator legs being arranged on a side of said commutator segments arranged toward said plurality of rotor magnetic poles.

5. A Commutator in accordance with claim 4, wherein:
   said varistor is arranged on a side of said commutator legs diametrically opposite said rotor magnetic poles.

6. A commutator in accordance with claim 4, further comprising:
   windings around said rotor magnetic poles, said windings being connected to said tip portions of said commutator legs.

7. A commutator in accordance with claim 2, further comprising:
   a shaft with a plurality of rotor magnetic poles, said commutator segments being mounted on said shaft, said plurality of commutator legs being arranged on a side of said commutator segments arranged toward said plurality of rotor magnetic poles.

8. A commutator in accordance with claim 7, further comprising:
   windings around said rotor magnetic poles, said windings being connected to said tip portions of said commutator legs.

9. A commutator in accordance with claim 1, wherein:
   a flatness of said flat shapes of said commutator legs are arranged in a radial plane of said cylindrical shape.

* * * * *